H. H. DICKERHOOF.
BALL BEARING.
APPLICATION FILED AUG. 19, 1916.

1,242,153.

Patented Oct. 9, 1917.

WITNESSES:
O. M. Kappler
Mary Gladwell

INVENTOR
HARVEY H. DICKERHOOF
BY Fay, Oberlin & Fay
ATTORNEYS.

# UNITED STATES PATENT OFFICE.

HARVEY H. DICKERHOOF, OF CANTON, OHIO.

BALL-BEARING.

1,242,153.

Specification of Letters Patent.  Patented Oct. 9, 1917.

Application filed August 19, 1916. Serial No. 115,769.

*To all whom it may concern:*

Be it known that I, HARVEY H. DICKERHOOF, a citizen of the United States, and a resident of Canton, county of Stark, and State of Ohio, have invented a new and useful Improvement in Ball-Bearings, of which the following is a specification, the principle of the invention being herein explained and the best mode in which I have contemplated applying that principle, so as to distinguish it from other inventions.

The present improvements have more particular regard to the provision of a ball bearing for taking up both radial and end thrust. The object of the invention is to provide line bearing contacts for the balls and their respective races, and improved facilities for maintaining the bearing lubricated, while at the same time the construction is left simple and capable of being easily assembled and taken apart. To the accomplishment of the foregoing and related ends, the invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
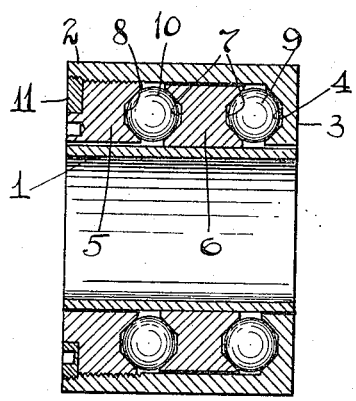
Figure 2:
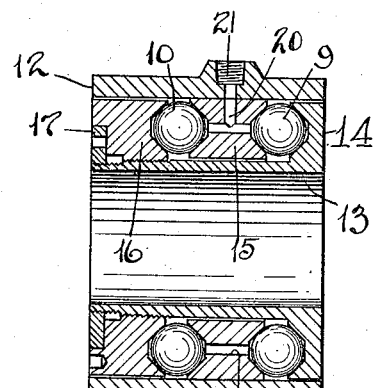

Figure 1 is a diametral section of a bearing employing my present improvements; and Fig. 2 is a similar view of a modified form of construction of the same.

As illustrated in Fig. 1, the bearing comprises the usual inner and outer tubular members 1 and 2, the former designed to fit on the shaft or spindle, and the latter in the box or casing of the relatively rotating part. The races for the balls are provided in part by means of an integral flange 3 on the one end of such outer member, such flange being formed with a polygonal groove 4 that constitutes one side of the race-way for one set of balls. Such groove may be otherwise described as having two straight but angularly related side-walls against which the balls bear on a line contact. Two axially spaced rings 5 and 6 interposed in the annular space between the two members, one such ring having similar grooves 7 on both its faces, and the other a single groove 8 on its inner face, complete the races for the two sets of balls 9 and 10. The intermediate ring 6 is tightly fitted onto the inner tubular member, while the last-named ring 7 is threaded into the outer member and securely locked in place by means of a locking ring 11, as will be readily understood, thereby constituting of said ring 7 a detachable, inwardly directed flange or member 2.

In the modified construction illustrated in Fig. 2, instead of the outer member 12 being formed with an integral flange, as in the first-described construction, such integral flange 14 is formed on the inner member 13, and the intermediate ring 15 is accordingly press-fitted or otherwise non-rotatably secured to the outer member, the remaining ring or second end-flange 16 being threaded onto the inner tubular member, and there locked by means of a lock ring 17, just as before. Said rings, or flanges, are provided with polygonal walled grooves 18, as before, for the anti-friction balls 19. In addition, however, the intermediate ring 15 is provided at one point with a T-shaped passage 20, the respective arms of which engage with a supply conduit 21 for lubricant in the outer tubular member 12, and with the recesses or grooves 18 in the faces of said ring. It will be obvious that lubricant may thus be introduced directly into both raceways, additional transverse communicating passages 22 being formed in the ring if desired, to insure thorough distribution of such lubricant.

From the foregoing description it will be observed that my improved ball bearing is not only self-contained, but that the balls are so inclosed as to permit of the retention of lubricant therein independently of whether the bearing as an entirety is inclosed. This insures the placing of the lubricant just where needed, without having to have the entire boxing filled with grease, as is necessary with current types of ball bearings. Furthermore, by reason of the unique polygonal grooves, or recesses, in which the balls travel, they are adapted to resist both radial and end thrust, and yet it will be observed, have only a double line contact with each side of the race, instead of traveling in grooves of corresponding curvature and cross-section, which means a very considerable increase in the amount of friction developed. Finally, the parts of my improved bearing are capable of being readily assembled and taken apart, since it will suffice to simply loosen the lock-ring, in either construction, whereupon the adjacent grooved ring may be unthreaded and the inner and outer members of the bearing thereupon separated by an end-wise movement.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a device of the character described, the combination of inner and outer, relatively rotatable tubular members; an integral flange on one end of one of said members; a corresponding flange at the other end, adjustably secured to one of said members; a ring adjustably interposed between said members intermediate of said flanges, the latter and said ring being formed on adjacent faces with grooves having angularly inclined side walls, and forming race-ways; anti-friction balls disposed in such race-ways, and means for adjusting said flange and said ring.

2. In a device of the character described, the combination of inner and outer, relatively rotatable tubular members; flanges on the opposed faces of said members, said flanges being formed on adjacent faces with corresponding grooves having straight side-walls angularly inclined with respect to each other and forming race-ways; anti-friction balls disposed in such race-ways; said inner flange being provided with communicating passages whereby lubricant may be introduced from one race-way to the other.

3. In a device of the character described, the combination of inner and outer, relatively rotatable tubular members; flanges on the opposed faces of said members, said flanges being formed on adjacent faces with corresponding grooves having straight side-walls angularly inclined with respect to each other and forming race-ways; anti-friction balls disposed in such race-ways, said outer tubular member and inner flange being provided with communicating passages whereby lubricant may be introduced into both race-ways from the exterior of said member.

4. In a device of the character described, the combination of inner and outer, relatively rotatable tubular members; an integral flange on one end of said inner member closing the space between the same and said outer member; a corresponding flange detachably secured to the other end of said inner member; a ring fixedly attached to said outer member intermediate of said flanges, the latter and said ring being formed on adjacent faces with corresponding grooves having straight side-walls angularly inclined with respect to each other and forming race-ways; and anti-friction balls disposed in such race-ways, said ring and outer member being provided with communicating passages whereby lubricant may be introduced into both race-ways from the exterior of said member.

5. In a device of the character described, the combination of inner and outer, relatively rotatable tubular members; flanges on the opposed faces of said members, said flanges being formed on adjacent faces with corresponding grooves having straight side-walls angularly inclined with respect to each other and forming race-ways; anti-friction balls disposed in such race-ways; the flange on said inner member being provided with communicating passages whereby lubricant may be introduced from one race-way to the other, and a lubricating passage through one of the outer members of the bearing communicating with one of the race-ways.

Signed by me, this 16 day of Aug. 1916.

HARVEY H. DICKERHOOF.

Attested by—
ADAM M. JACKMAN,
GEO. H. KERVIM.